April 2, 1946.  W. B. HACKETT  2,397,603
SHEARING APPARATUS
Filed Jan. 20, 1945  8 Sheets-Sheet 1
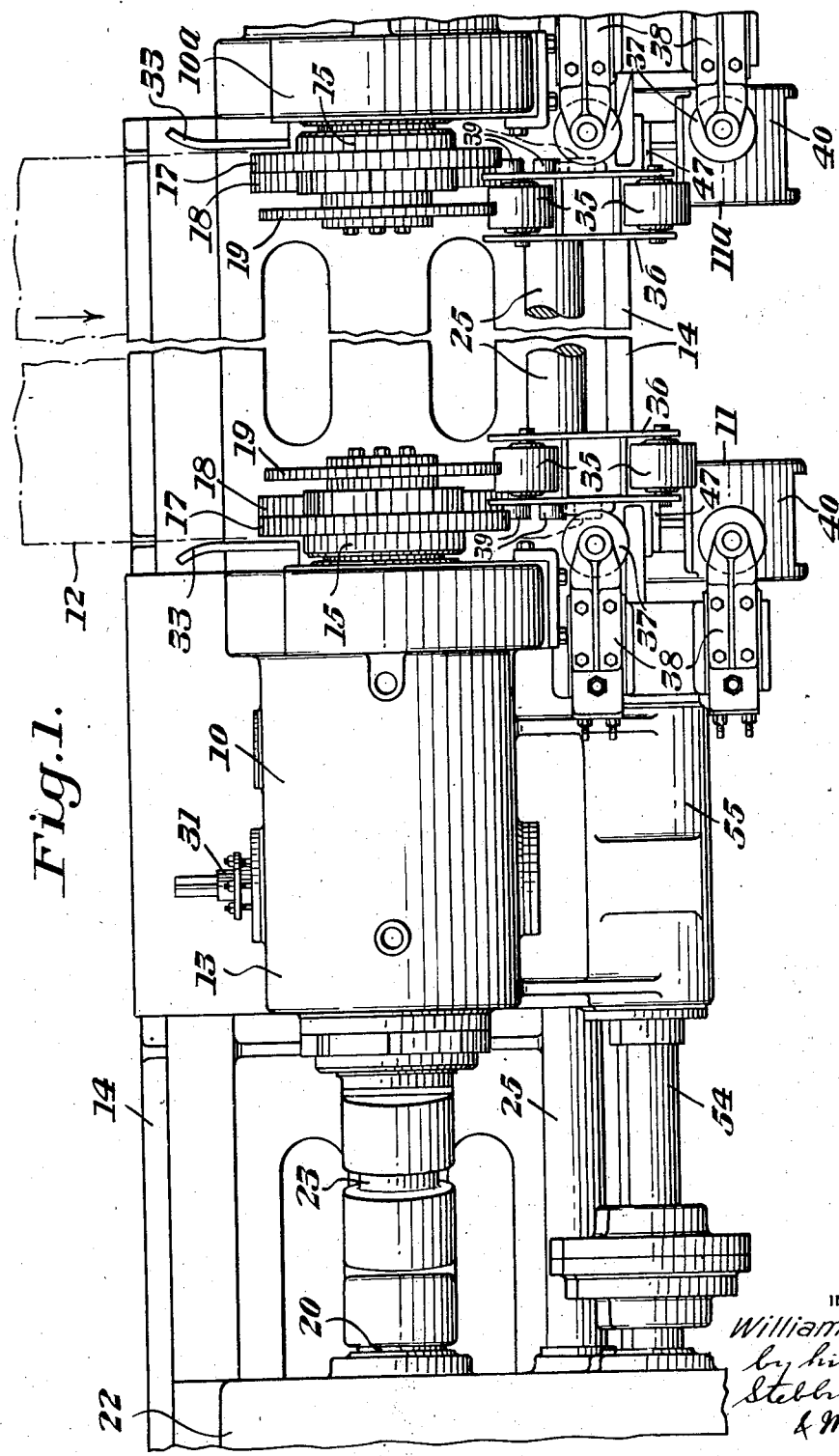
INVENTOR
William B. Hackett
by his attorneys
Stebbins, Blenko
& Webb

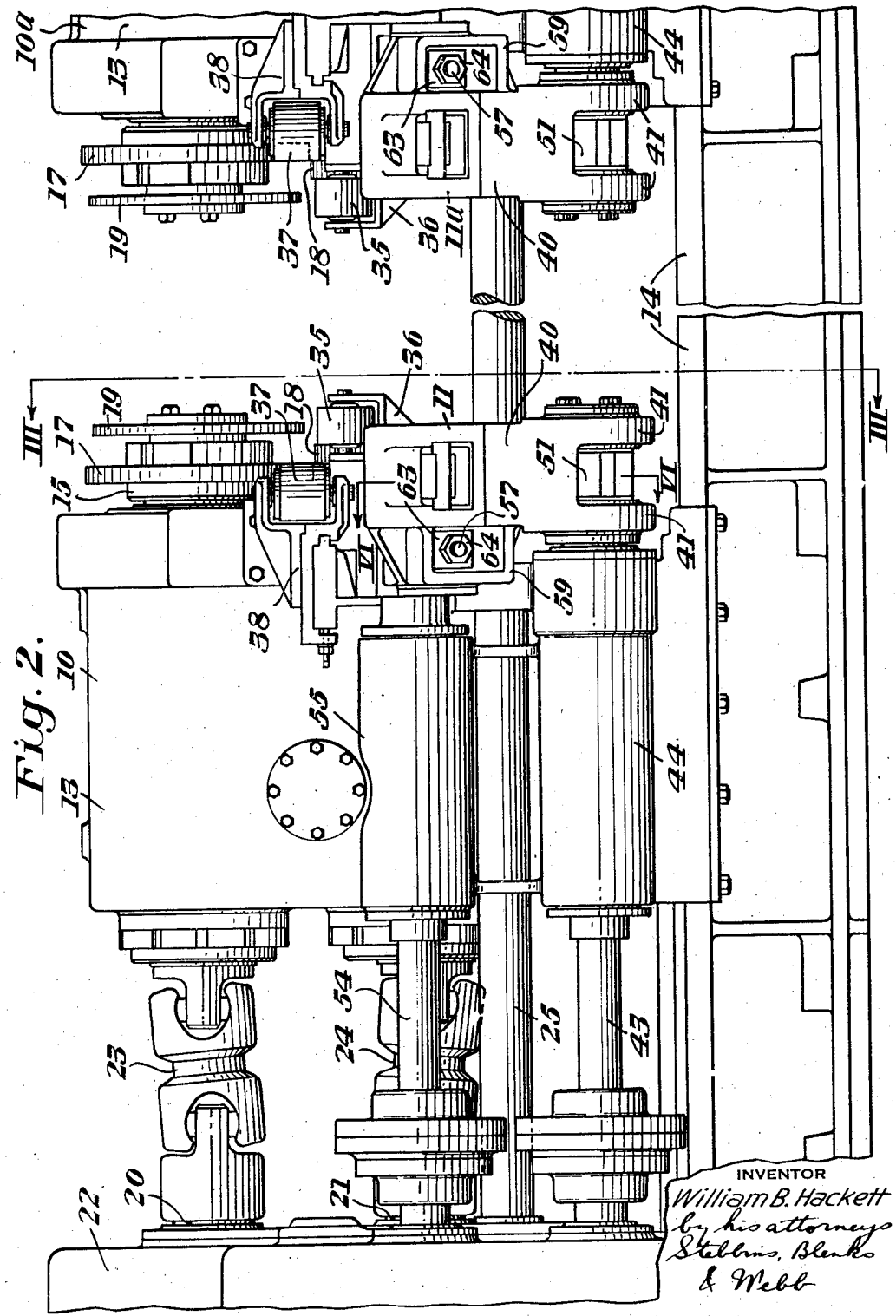

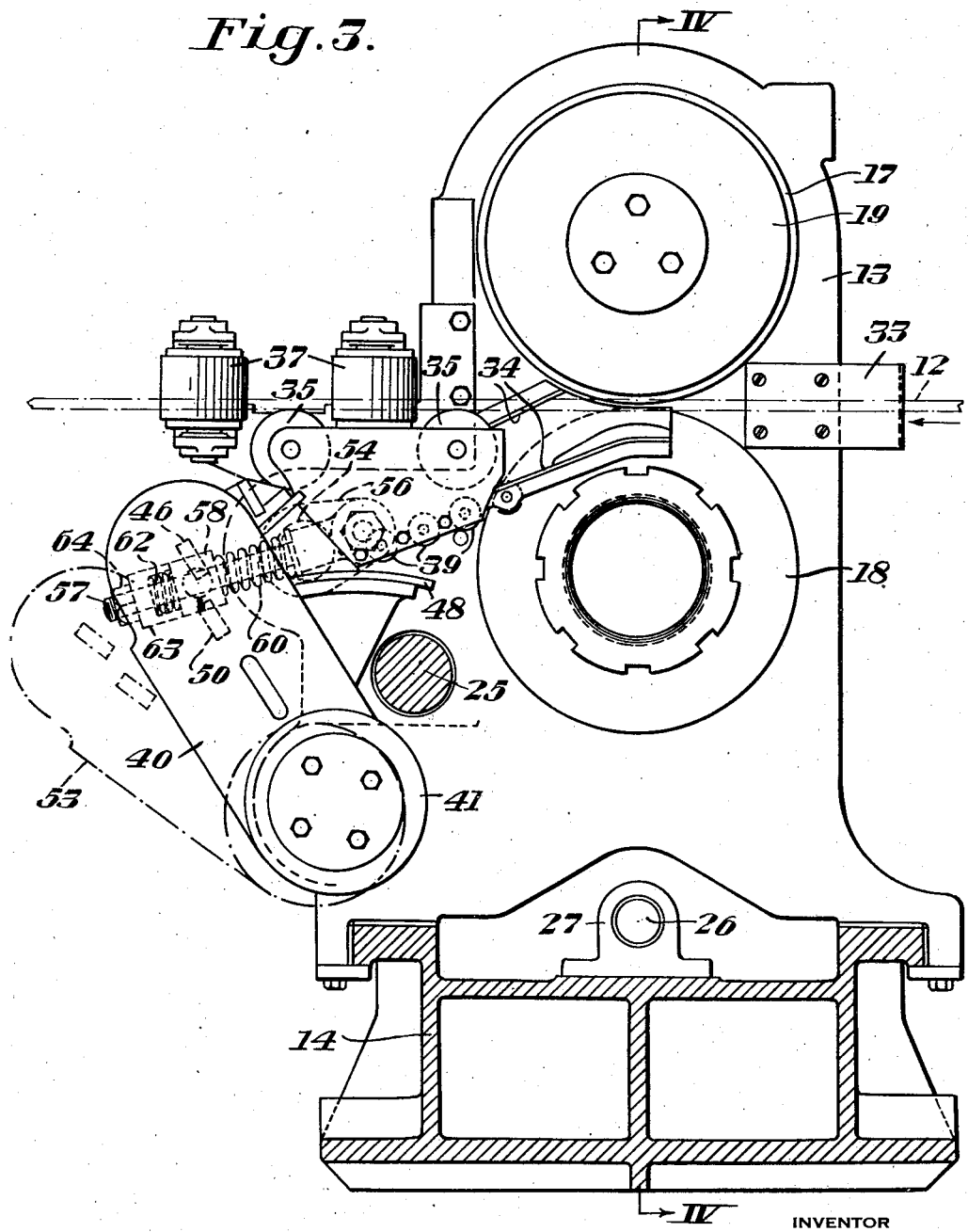

April 2, 1946. W. B. HACKETT 2,397,603
SHEARING APPARATUS
Filed Jan. 20, 1945 8 Sheets-Sheet 4
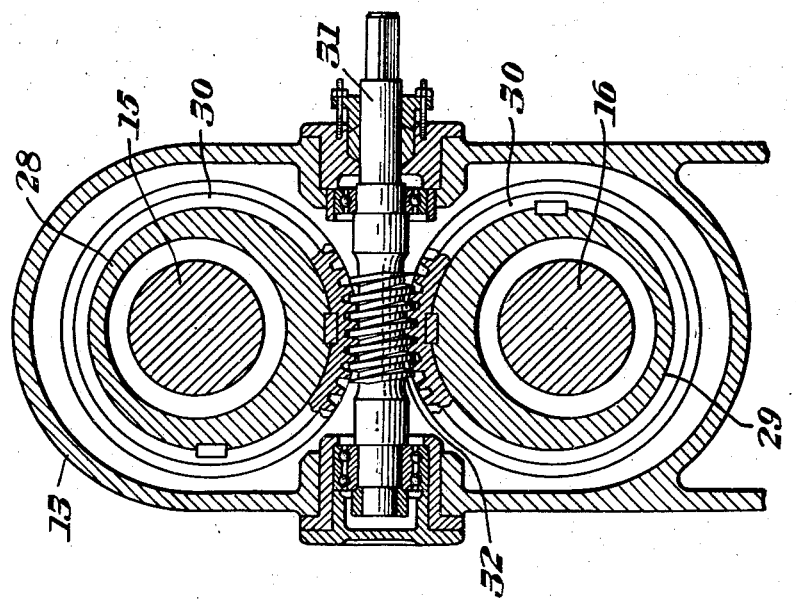
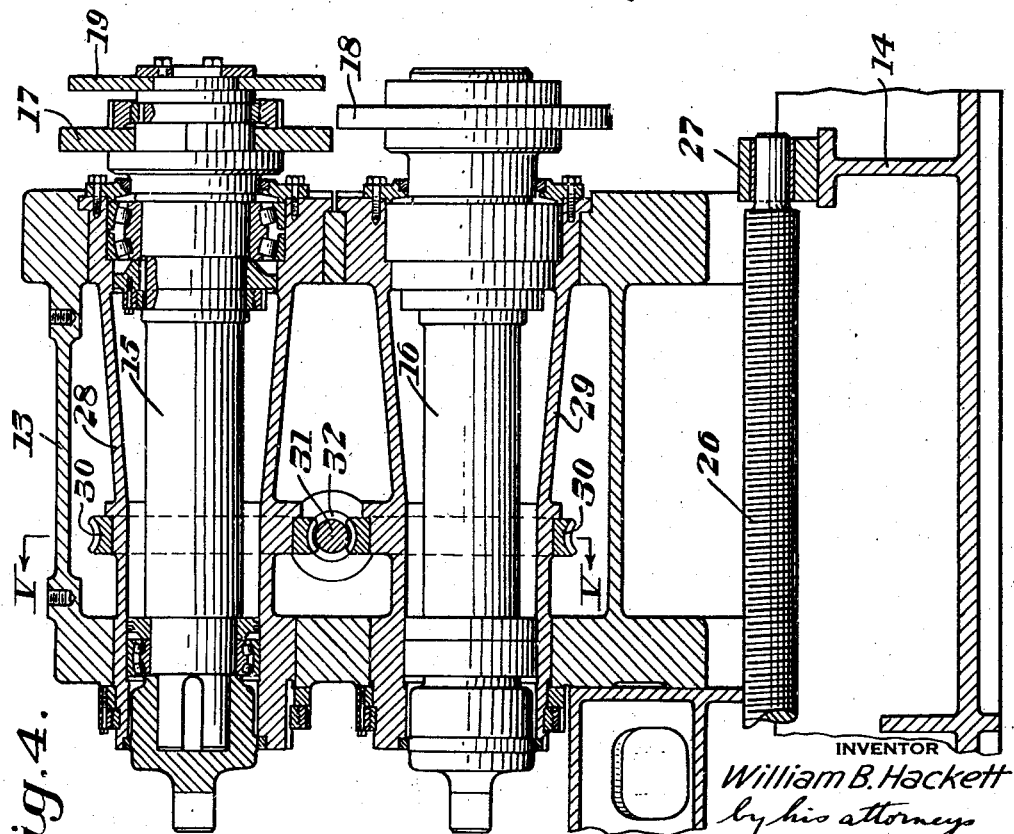
INVENTOR
William B. Hackett
by his attorneys
Stebbins, Blenko & Webb April 2, 1946.  W. B. HACKETT  2,397,603
SHEARING APPARATUS
Filed Jan. 20, 1945  8 Sheets-Sheet 5

INVENTOR
William B. Hackett
by his attorneys
Stebbins, Blenko & Webb

April 2, 1946.  W. B. HACKETT  2,397,603
SHEARING APPARATUS
Filed Jan. 20, 1945  8 Sheets-Sheet 6
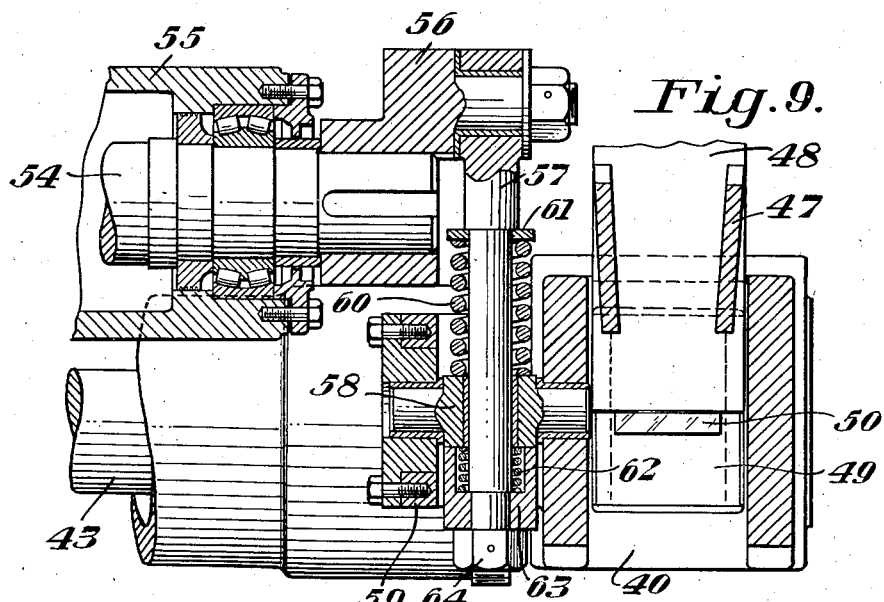
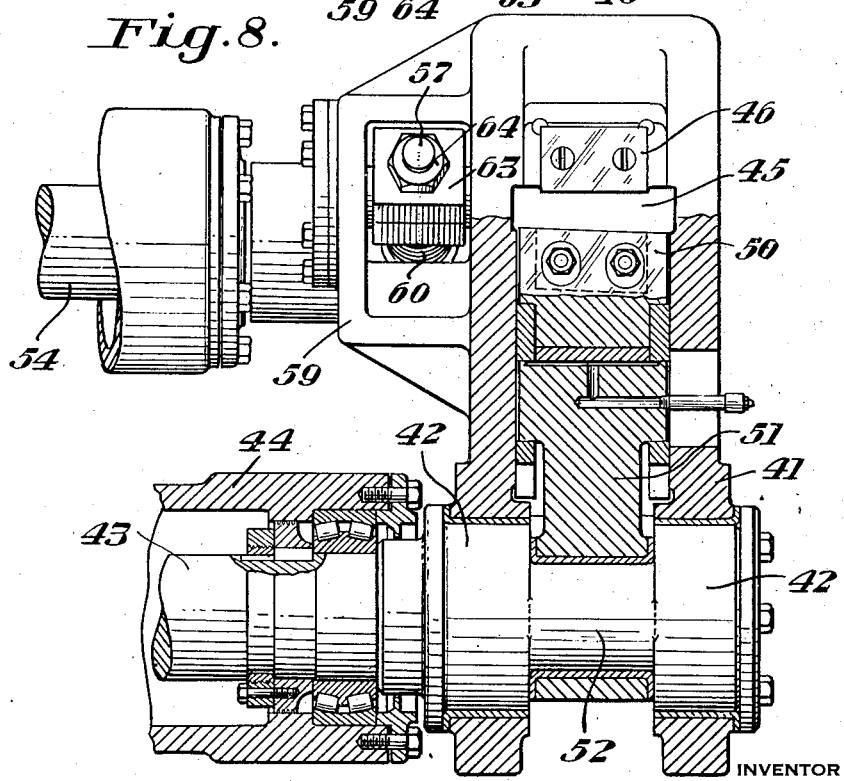
INVENTOR
William B. Hackett
by his attorneys
Stebbins, Blenko & Webb

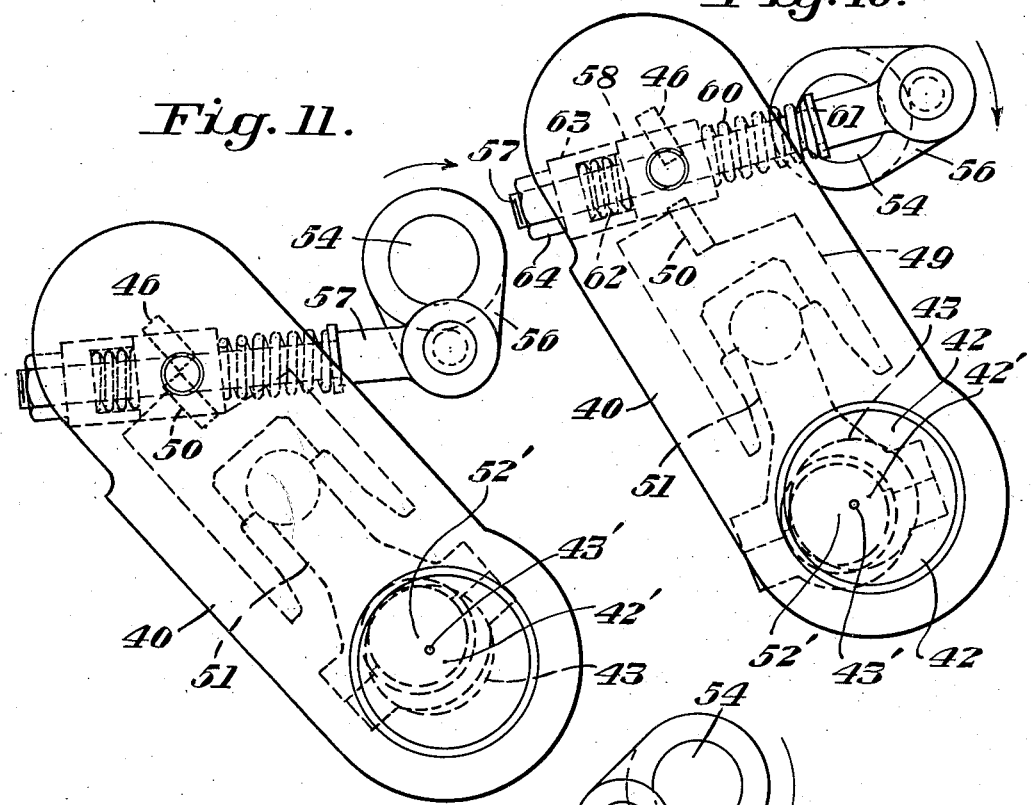
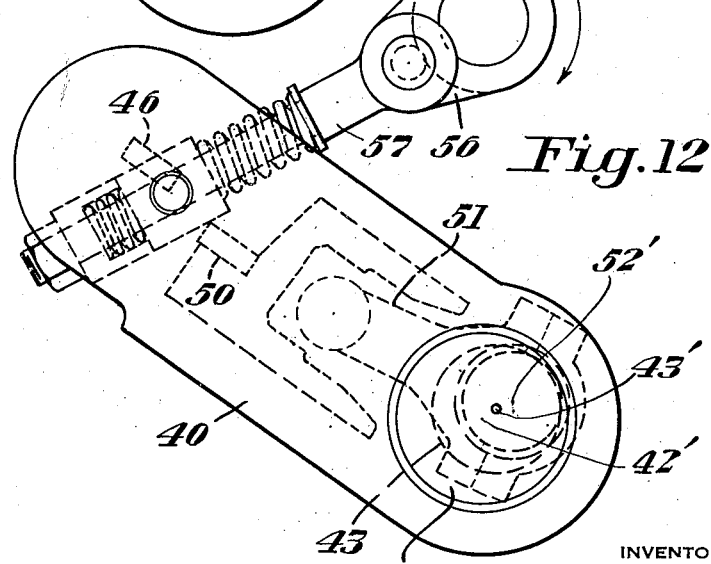

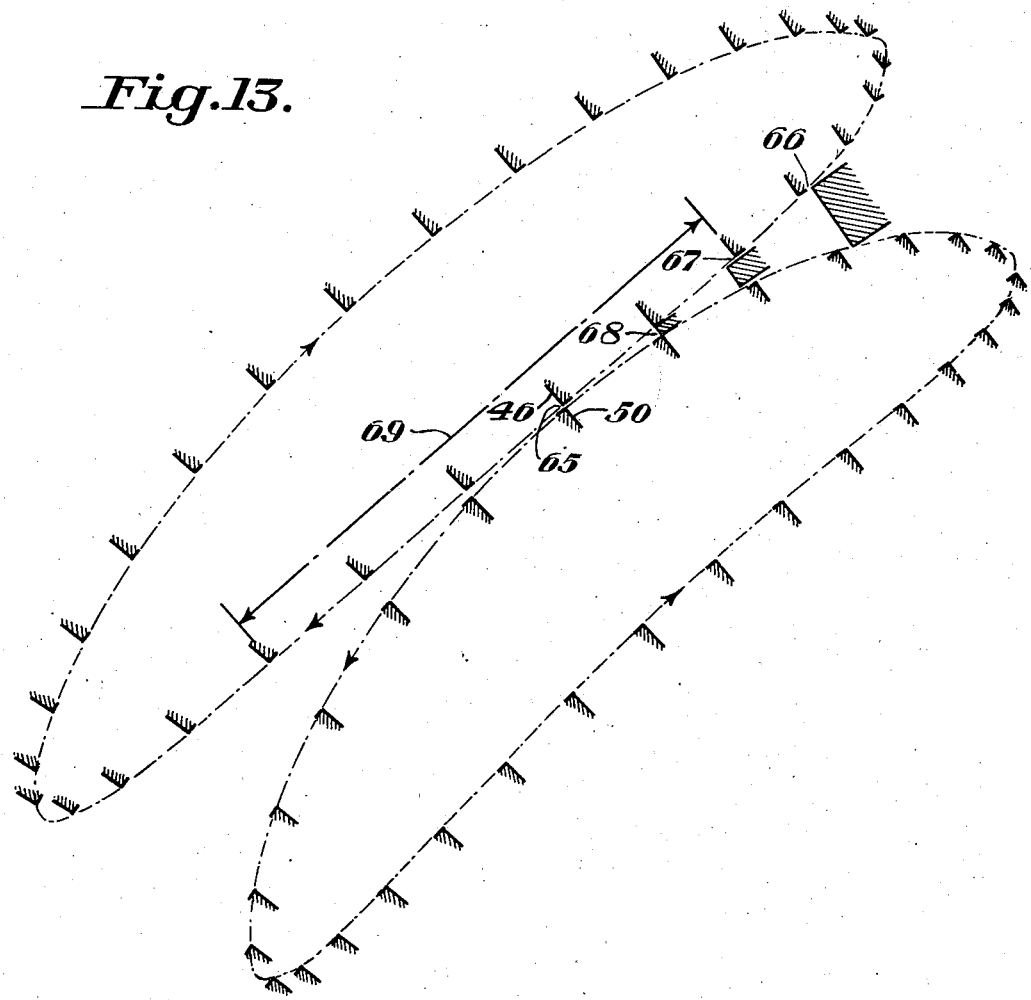

Patented Apr. 2, 1946

2,397,603

UNITED STATES PATENT OFFICE 2,397,603

SHEARING APPARATUS

William B. Hackett, Salem, Ohio, assignor to Blaw-Knox Company, Pittsburgh, Pa., a corporation of New Jersey Application January 20, 1945, Serial No. 573,681

16 Claims. (Cl. 164—10.6)

This invention relates to apparatus for shearing metal plate and, in particular, to a shear adapted to trim a rolled edge from a plate and sever the narrow piece of scrap sheared off into pieces of a length convenient for handling. The apparatus includes an edge-trimming shear having a pair of opposed rotary disc cutters and a flying shear including cooperating blades which reciprocate toward and from each other and also move with the sheared-off edge scrap while making a cut therethrough and then return to the starting position for commencing the next cut.

Shears of the general type contemplated by this invention have been known heretofore. It is an object of my invention to provide an improved shearing apparatus characterized by simple and rugged construction, rapid and efficient operation and ease of maintenance and adjustment. In particular, I provide an improved flying shear cooperating with an edge-trimming shear having certain novel features. The flying shear, furthermore, is of such construction that it is exceptionally well adapted for use in combination with an edge-trimming shear, although it may also be employed independently thereof.

While flying shears cooperating with edge-trimming shears have been proposed heretofore, the operation of known types of shears has not been free from difficulty. This difficulty arises from the fact that the speed of the material being sheared is determined by the peripheral speed of the rotary disc cutters unless the material is fed to the shears under positive control as by pinch rolls, which is not usually the case. While this speed can be selected for a given diameter of the cutters, the practice of grinding the cutters periodically and thereby reducing their diameter involves a periodic change in their peripheral speed, assuming that they are driven at a constant angular velocity. In order to synchronize the travel of the sheared-off scrap edge precisely with the movement of the flying shear at the moment of cutting, the speed of the drive of the flying shear would have to be variable by infinitesimal increments. This is not practical except at excessive cost. In fact, it is usually desirable to drive the edge-trimming shear and the flying shear by the same means so that the speed of both may be varied simultaneously to the same extent. Any variation between the speed of the severed edge or other material being sheared and the speed of travel of the flying-shear blades at the moment of cutting causes the material to be slashed off roughly instead of cut smoothly and introduces heavy instantaneous stresses in various parts of the apparatus which are highly undesirable and may be seriously injurious.

I have invented a novel form of flying shear which overcomes the aforementioned difficulty by providing a slight freedom of movement of the flying shear relative to the means for advancing it in the direction of movement of the material to be sheared. In a preferred embodiment, the flying shear comprises an arm or housing mounted for oscillation about an axis adjacent its lower end and provided adjacent the other end with a throat for receiving the material to be sheared and cooperating blades for periodically cutting it. The blades are actuated by eccentrics on a shaft on which the arm pivots. Oscillating movement of the arm is produced by a crank arm, a second shaft and a pitman extending between the crank and the arm. The pitman has a pivotal and yielding connection to the arm so that if the arm tends to travel faster at the moment of cutting than the material being sheared, it may be retarded by engagement with the material without introducing excessive stress into the parts or making a ragged cut. When the flying shear is used in cooperation with the edge-trimming shear, its speed is determined relative to the speed at which the material is delivered by the edge-trimming shear when the rotary cutters thereof have their minimum diameters, so that the blades of the flying shear move slightly faster than the material. When the diameters of the rotary cutters are above the minimum value, the tendency of the sheared edge to run ahead of the flying shear blades will be greater but the flying shear is designed to accommodate such greater discrepancy.

My flying shear is of such construction, furthermore, that the angle of oscillation of the blade-carrying arm need not be large, even though it is desired to cut scrap into lengths varying over a substantial range. I limit the angle of oscillation by providing a construction which permits the speed of oscillation in one direction to be greater than the speed in the other direction. By speeding up the movement in the direction in which a cutting stroke is effected, the amplitude of oscillation may be reduced below that required if the speeds were the same in both the cutting and return throws. For short lengths of cut, it will usually be desirable to have the return throw faster than the cutting throw.

A complete understanding of the invention may be gained from consideration of the following detailed description in connection with the accompanying drawings illustrating a preferred embodiment.

In the drawings:

Figure 1 is a plan view showing a complete shearing apparatus including a pair of oppositely disposed edge-trimming shears with a flying shear so positioned relative to each as to receive one of the sheared edges delivered thereby;

Figure 2 is a side elevation;

Figure 3 is an end view with a part in section taken along the plane of line III—III of Figure 2;

Figure 4 is a partial section taken along the plane of line IV—IV of Figure 3;

Figure 5 is a partial section taken along the plane of line V—V of Figure 4;

Figure 8 is a partial section taken along the plane of line VIII—VIII of Figure 6, with parts in elevation;

Figure 9 is a section taken along the plane of line IX—IX of Figure 6;

Figures 10 through 12 are partial side elevations, largely diagrammatic, showing successive positions of the flying-shear arm in executing a forward stroke and shearing cut; and Figure 13 is a diagram showing successive positions of the flying-shear blades at various points in their complete cycle including forward and reverse movements.

Figures 6, 7:
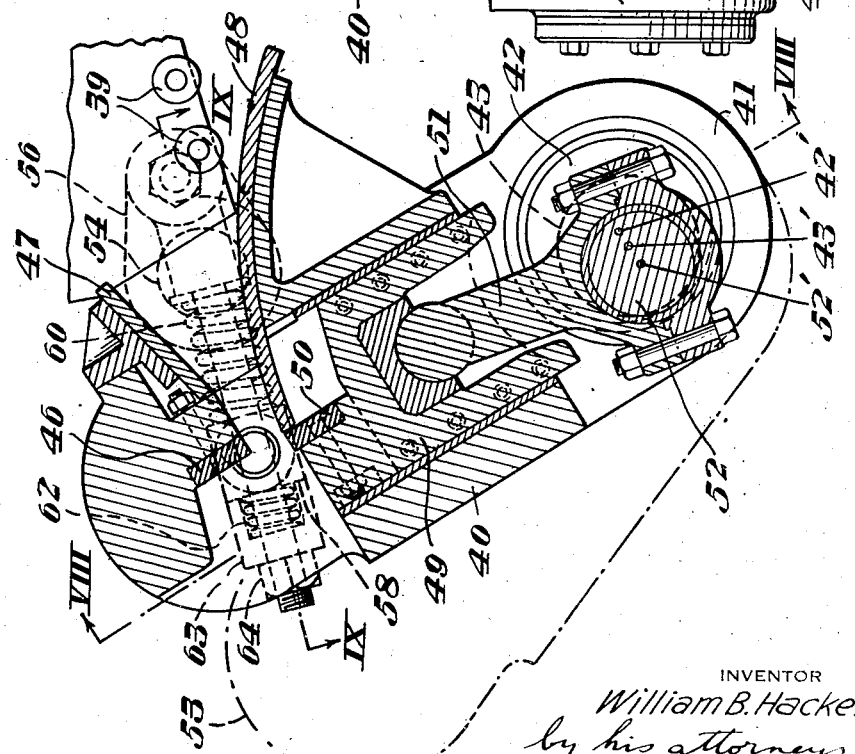
Figure 6 is a section through the flying shear taken along the plane of line VI—VI of Figure 2.
Figure 7 is an elevation of the flying shear such as would be seen by looking on Figure 6 from the right.

Referring in detail to the drawings and to Figures 1 through 3 in particular, the apparatus of my invention comprises an edge-trimming shear 10 and a flying shear 11. In most cases, the apparatus is duplicated on opposite sides of the center line of the path of travel of a plate to be sheared, such as that indicated at 12. In the drawings, the second edge-trimming shear is indicated at 10a and the associated flying shear at 11a. The shear 10 includes a housing 13 gibbed to a base 14 for sliding movement therealong. Vertically alined parallel shafts 15 and 16 are journaled in the housing 13 and have cooperating disc cutters 17 and 18 secured to the inner ends thereof, respectively. The shaft 15 also has a hold-down disc 19 adapted to engage the upper surface of the plate 12 near the edge being sheared therefrom.

The shafts 15 and 16 are driven by shafts 20 and 21 projecting from a pinion housing 22, through the usual universal couplings and driving spindles 23 and 24. The gears in the housing 22 may be driven by any convenient means, such as a motor (not shown) coupled to a shaft 25 extending through the pinion housing and alongside the shear housing 13, across the width of the plate 12 and being correspondingly related to the shear 10a. A driving gear in the housing 22 is splined on the shaft 25 whereby the housings 13 and 22 may be moved longitudinally along the base 14. If desired, the shaft 25 may have a driving motor coupled to each end thereof. Adjustment of the housings along the base is effected by a screw shaft 26, the inner end of which is journaled in a bearing 27, and threaded through a nut carried by the housing 22. The outer end of the shaft 26 may be journaled in any suitable bearing and driven in any convenient manner, either by hand or by a motor.

Referring now particularly to Figures 4 and 5, the shafts 15 and 16 are journaled in spaced bearings carried by sleeves 28 and 29 rotatable in the housing 13. As shown in Figure 5, the axis of each shaft is off center relative to the axis of rotation of the sleeve in which it is positioned. Each sleeve has a worm gear 30 keyed thereon. A shaft 31 journaled in suitable bearings in the housing 13 has a worm 32 thereon meshing with both the gears 30. One end of the shaft 31 projects from the housing 13 and is squared to receive an adjusting wrench or hand crank. It will be apparent that rotation of the shaft causes rotation of the sleeves 28 and 29 which adjusts the shafts 15 and 16 and the disc cutters 17 and 18 toward or away from each other. It is thus possible to maintain proper cooperative relation of the cutters even after their diameters have been materially reduced from their original value by successive grinding operations.

The plate 12 is delivered to the shears 10 and 10a from any suitable means, such as a roller conveyor. Side guides 33 on the housing 13 position the plate laterally. The edges of the advancing plate are progressively sheared by the cutters 17 and 18 and the sheared edges are deflected downwardly by guides 34 carried on the housing 13. The sheared plate advancing beyond the housings is carried on supporting rollers 35 journaled in a bracket 36 secured to the housing 13. Guide rolls 37 for engaging the edges of the sheared plate are journaled in brackets 38 supported on the housing 13. Guide rollers 39 are journaled on the bracket 36 for directing the sheared edge into the flying shear 11.

The shear 11 comprises an oscillating arm 40 having spaced walls terminating in bearings 41 at its lower end as shown in Figure 7. The bearings 41 are journaled on eccentrics 42 near the end of a shaft 43. The shaft 43 is journaled in a bearing box 44 formed on the housing 13. The arm 40 has an opening 45 therethrough adapted to receive the severed plate edge to be sheared into short lengths. A blade 46 is secured in the arm adjacent the upper side of the opening 45. Converging guides 47 and 48 on the entering side of the shear define a throat for directing the sheared edge into the opening 45.

A crosshead 49 is reciprocably disposed between the spaced walls of the arm 40 and is provided at its upper end with a blade 50 adapted to cooperate with the blade 46. A pitman 51 pivoted to the crosshead is journaled on an eccentric 52 on the shaft 43 between the eccentrics 42. The eccentric 52 is offset from the center of the shaft 43 in a direction opposite that in which the eccentrics 42 are offset. Referring to Figure 6, the center of the shaft 43 is shown at 43', the center of the eccentrics 42 at 42' and the center of the eccentric 52 at 52'. Considering the arm 40 as remaining in the angular position shown in Figure 6, it will be apparent that clockwise rotation of the shaft 43 will cause the arm to move downwardly and the crosshead 49 to move upwardly whereby the blades 46 and 50 are caused to execute a cutting operation. Continued rotation of the shaft, of course, restores the blades to the position shown in Figure 6, which may be considered the starting point of a cutting operation. In order that the blades travel with the material during their engagement therewith, the arm 40 is continuously oscillated between the starting point and an extreme forward position indicated by a chain line 53 in a predetermined timed relation with the rotation of the shaft 43. As shown in Figure 2, this shaft is coupled to a shaft projecting from the pinion housing 22.

In order to effect the oscillating movement of the arm 40, a shaft 54 is journaled in a bearing box 55 carried by the housing 13 and is coupled to another shaft projecting from the pinion housing 22. The pinion housing is designed to drive the shafts 43 and 54 in the same direction at the same speed. The shaft 54 has a crank 56 at its extreme end. A pitman 57 is pivoted on the crank 56 and has a pivotal yielding connection with the arm 40. A block 58 is trunnioned in a pocket 59 formed on the outer side of the arm 40 and slidably receives the pitman 57. A compression spring 60 is confined between a collar 61 on the pitman and the block 58. Since the pitman is slidable through the block, the force exerted by the crank 56 tending to move the arm 40 forward is transmitted by the spring 60. Thus if anything tends to restrain forward movement of the arm, such as engagement of the blades 46, 50 with material traveling at a somewhat lower rate than the blades, the difference in travel is accommodated by compression of the spring. A second spring 62 is confined between the block 58 and a collar 63 secured on a pitman by a nut 64. The spring 62 serves to cushion the engagement of the collar 63 with the block 58 as the spring 60 restores the pitman to its normal position relative to the block.

Figures 10 through 12 show diagrammatically the initial, intermediate and final positions of the arm 40 as it swings forward to make a shearing cut. Figure 10 corresponds to Figure 6 and shows the blades 46, 50 in wide open position. Rotation of the shaft 54 through an angle of about 90° advances the arm 40 to the position shown in Figure 12. Corresponding rotation of the shaft 43 occurring simultaneously causes the blades to move to fully closed position. The severance of the sheared edge traversing the throat defined by guides 47 and 48 is actually completed before the blades reach the position shown in Figure 11, since it is only necessary for the blades to displace the metal at the cutting plane through about two-thirds of the total thickness to effect severance of the metal.

Continued rotation of the shafts 54 and 43 causes the arm to reach its forward limiting position at which the blades are again open somewhat wider than in Figure 10. Further rotation of the shaft 54 restores the arm 40 to starting position. During the return movement of the arm, rotation of the shaft 43 causes the blades to open even more widely than shown in Figure 12, after which they commence to reclose, reaching the relative positions shown in Figure 10 as the arm is returned to the starting point.

The crank shaft 54 for oscillating the arm 40 is located at one side of the shear and, in the present example, at substantially the same distance from the cutter-operating shaft 43 as the distance from the upper knife to the center of its crank 42, although this relation is not controlling. The pitman 57 between the oscillating crank and the arm is secured to the latter substantially at the point of cutting, so as to support the end of the arm where the cutting forces are applied. The crank 56 of the shaft 54 and the eccentric 52 on shaft 43 are so oriented that the knives are closest together substantially midway between the extreme forward and back positions of the arm 40. In the particular embodiment described, crank 56 rotates through somewhat less than 180° on the forward (cutting) stroke and somewhat more than 180° on the return stroke; but this relation can be varied by changing the distance between crank shafts 54 and 43 if desired. The effect of varying this relation is to vary the velocity of the blades on the forward stroke for a given frequency of cutting operations. As the forward stroke is accomplished in less time as the angle effecting it is reduced, the forward velocity of the blade is correspondingly increased, although the time interval between successive cuts is unchanged.

Figure 13 illustrates successive positions of the blades 46 and 50 at equal intervals of time throughout a complete operating cycle. The paths of the blades, of course, are resultants of the movements imparted to the arm 40 and crosshead 49 by the eccentrics 42 and 52 on the one hand, and by the crank 56 and pitman 57 on the other. As shown in Figure 13, the blades reach their fully closed position indicated at 65 approximately midway of the forward (i. e., counterclockwise) movement of the arm 40. The point of initial engagement of the blades with the material being sheared depends, of course, on the thickness of the material as does also the position of the blades at the instant of severance which, as stated above, occurs when the blades have cut approximately two-thirds of the way through the material. The apparatus may conveniently be designed to shear material varying in thickness from ¼" to ¾", for example. When shearing material in this range of thickness, it will be evident that the severance is completed when the blades have advanced about one-third of the distance from the starting position to the extreme advanced position. For ¾" plate, the point of initial engagement of the shear blades therewith is approximately that designated 66 and the point of final severance approximately that shown at 67. For ¼" plate, the point of initial engagement is approximately that designated 67 and the point of final severance approximately that designated 68.

It is desirable to vary the speed of the entire apparatus depending on the thickness of the material being sheared since ¼" plate, for example, may be sheared at a considerably higher speed than ¾" plate. The apparatus described above facilitates this speed adjustment since it is only necessary to vary the speed of the driving motors to adjust the speed of both the edge-trimming shear and the flying shear simultaneously and to the same extent. A further advantage, already alluded to, is the fact that minor discrepancies between the delivery speed of the sheared edge and the speed at which the shear blades move through space at the moment of cutting, resulting from the gradual reduction of the diameter of the disc cutters 17 and 18 as they are successively reground, are accommodated by the yielding connection including spring 60 between the arm 40 and the crank 56 which oscillates it. The apparatus is designed so that when the disc cutters 17 and 18 have their minimum diameters, the speed at which the sheared edge is delivered to the flying shear is slightly less than the speed of movement of the flying-shear blades through space at the moment of engagement with the sheared plate edge. Thus the arm 40 is slightly retarded by engagement of the blades with the sheared edge. This retardation is permitted by the spring 60 without introducing excessive stress into any of the parts and permits the blades to move at the speed identical with that of the scrap edge so that a clean cut results instead of a ragged slashing off as would be obtained in the case of a slight difference between the speed of the shear blades and the scrap edge. When the disc cutters 17 and 18 have their maximum diameters, the difference between the speed of the material and that of the blades is somewhat increased but is within the range of the compression of the spring 60 during the period of actual engagement of the blades with the material, which, as shown in Figure 13, is quite short.

As previously stated, the flying shear is not confined to use with the edge-trimming shear but has advantages for general application. As indicated by dotted line 69 in Figure 13, the path of the blade 46 through the greater portion of the cutting stroke is substantially linear. The blade 46 being fixed to the arm 40, it follows that the upper side of the opening through the arm has a similar movement, thus making it peculiarly adapted to the cutting of material travelling in a straight line. In such case, of course, the flying shear would be so oriented that the line 69 would coincide with the path of the material advancing to the shear.

Figure 13 also shows that the speed of the blades 46 and 50 is substantially uniform while making a cut. In the particular embodiment described, crank 56 rotates through an angle less than 180° on the forward or cutting stroke and an angle more than 180° on the return stroke. This relation, however, may be varied by changing the distance between shafts 43 and 54, if desired. The effect of such a change is to vary the velocity of the blades on the forward stroke for a given frequency of cutting, since the forward stroke is accomplished in less time as the angle in which it is effected is reduced. The forward velocity of the blade is correspondingly increased although the interval between cuts remains the same.

A further advantage will be evident from Figure 13, viz., the fact that on the return movement of the blades 46 and 50, they are widely separated, leaving the throat defined by guides 47 and 48 entirely unobstructed for continued free passage of the sheared plate edge therethrough.

It will be evident that the length of the pieces into which the scrap edge is sheared will depend on the ratio between the speed of the shafts 15 and 16 and the speed of the shafts 43 and 54 (assuming a fixed diameter of the cutters 17 and 18). The determination of this ratio is a simple matter in designing the mechanism for driving the edge-trimming shear and the flying shear.

Although I have illustrated and described only a preferred embodiment of my invention, it will be recognized that changes in the construction and arrangement of the details disclosed may be made without departing from the spirit of the invention or the scope of the appended claims.

I claim:

1. In a shear, a shaft, an arm, one end of said arm being journaled eccentrically on said shaft being off-center in one direction and having a shear blade secured thereto, a crosshead slidable along said arm and having a shear blade thereon adapted to cooperate with said first-mentioned blade, a pitman journaled eccentrically on said shaft being off-center in a direction opposite that in which said arm is off-center and being pivoted to said crosshead, a second shaft parallel to said first-mentioned shaft, a crank on said second shaft, a second pitman pivoted to said crank and to said arm near the end thereof opposite said one end, a yielding connection between said second pitman and said arm, and means for driving said shafts at the same speed.

2. In a shear, a shaft, eccentrics on said shaft offset in different directions, an arm journaled at one end on one of said eccentrics, a crosshead slidable on said arm, a pitman journaled on the other of said eccentrics and pivoted to said crosshead, cooperating shear blades on said arm and crosshead, a second shaft, a crank thereon, a second pitman journaled on said crank and pivoted to said arm at a point spaced from said one end thereof, a yielding connection between the second pitman and said arm, and means for driving said shafts.

3. In a shear, a shaft, eccentrics on said shaft offset in different directions, an arm journaled at one end on one of said eccentrics, a crosshead slidable on said arm, a pitman journaled on the other of said eccentrics and pivoted to said crosshead, cooperating shear blades on said arm and crosshead, a second shaft, a crank thereon, a second pitman journaled on said crank, a yieldable pivotal connection between said second pitman and a point on said arm spaced from said one end thereof, and means for driving said shafts.

4. In a shear, a shaft, eccentrics on said shaft offset in different directions, an arm journaled on one eccentric and having a crosshead slidable thereon, a pitman journaled on the other eccentric and pivoted to said crosshead, cooperating blades mounted on said arm and crosshead so as to approach and recede from each other on rotation of said shaft, a second shaft having a crank thereon, a second pitman journaled on said crank and pivotally connected to said arm at a point spaced from the journal portion engaging said one eccentric, a spring on said second pitman for urging said arm in one direction on movement of the second pitman in that direction, and means for driving said shafts.

5. In a shear, a shaft, eccentrics on said shaft offset in different directions, an arm journaled on one eccentric and having a crosshead slidable thereon, a pitman journaled on the other eccentric and pivoted to said crosshead, cooperating blades mounted on said arm and crosshead so as to approach and recede from each other on rotation of said shaft, a second shaft having a crank thereon, a second pitman journaled on said crank, means yieldably and pivotally connecting said second pitman to said arm and means for driving said shafts.

6. In a shear, a shaft, eccentrics on said shaft offset in different directions, an arm journaled at one end on one of said eccentrics, a crosshead slidable on said arm, a pitman journaled on the other of said eccentrics and pivoted to said crosshead, cooperating shear blades on said arm and crosshead, a second shaft, a crank thereon, a second pitman journaled on said crank, a pivotal slidable connection between said second pitman and said arm, means yieldably opposing sliding movement of said second pitman relative to said arm, and means for driving said shafts.

7. In a shear, a shaft, eccentrics on said shaft offset in different directions, an arm journaled on one eccentric and having a crosshead slidable thereon, a pitman journaled on the other eccentric and pivoted to said crosshead, cooperating blades mounted on said arm and crosshead so as to approach and recede from each other on rotation of said shaft, a second shaft having a crank thereon, a second pitman journaled on said crank, a block pivoted on said arm, said second pitman being slidable in said block, a spring opposing sliding movement of the second pitman in said block, and means for driving said shafts.

8. In a flying shear, a shaft, an arm journaled thereon for oscillation between two extreme positions, cooperating blades on said arm, one of which is movable toward and from the other, eccentric means on the shaft for actuating the movable blade, a second shaft, a crank-and-pitman connection between said second shaft and said arm, said connection including yielding means permitting said arm to lag behind the crank and absorb any excess of the travel of the material being sheared over the travel of the arm, while said blades are making a cut, and means for driving said shafts.

9. The apparatus defined by claim 8 characterized by eccentric means on said first-mentioned shaft effecting a longitudinal reciprocation of said arm in predetermined time relation to its oscillation.

10. In a flying shear, a shaft, an arm journaled thereon for oscillation between two extreme positions, cooperating blades on said arm, one of which is movable toward and from the other, eccentric means on the shaft for actuating the movable blade, and a crank and pitman for actuating said arm back and forth between said positions, said pitman including a yieldable connection permitting the arm to lag behind the actuating means and accommodate the travel of the blades to that of the material being sheared, while the blades are making a cut.

11. In a flying shear, a shaft, an arm journaled thereon for oscillation between two extreme positions, cooperating blades on said arm, one of which is movable toward and from the other, eccentric means on the shaft for actuating the movable blade, a second shaft, a crank-and-pitman connection between said second shaft and said arm, the pitman of said connection being slidable in a block pivoted to said arm, and a spring on said pitman for applying to the arm the force of the crank, said spring permitting retardation of the arm relative to the pitman while said blades are making a cut.

12. In a shear, the combination with a pair of cooperating disc cutters adapted to shear the edge from a traveling plate and deliver it at a predetermined speed, and means for adjusting said cutters toward and from each other to compensate for a change in the diameter thereof which causes a change in said speed, of a flying shear adapted to sever the sheared edge into lengths comprising an oscillatable arm having an entry throat to receive the sheared edge and cooperating blades for cutting it, and means for oscillating said arm including a thrust member having a spring thereon for transmitting thrust to said arm and permitting a predetermined disparity between the travel of the arm and the travel of said means while said blades are making a cut, whereby said flying shear may operate in the same time relation with said cutters for various diameters thereof in a limited range.

13. The combination with an edge-trimming shear for removing an edge from a traveling plate at a substantially constant rate, of a flying shear comprising a tiltable arm having blades cooperating to sever the sheared edge, and a crank-and-pitman for oscillating said arm including a yielding connection permitting a limited disparity between the travel of the arm and the travel of said means while said blades are making a cut, whereby said flying shear may operate in the same time relation with said cutters for various diameters thereof in a limited range.

14. In a flying shear comprising an arm oscillatable about a pivot and having knives therein mounted for relative radial reciprocating movement toward and away from each other, knife reciprocating means, means for oscillating said arm through a fixed regular displacement, said oscillating means comprising a crank pin rotating in a fixed circular orbit and a connecting rod pivotally connected at its ends to said arm and said crank pin, respectively, the center of said orbit being at one side of said arm and spaced from the line through the extreme positions of the pivotal connection of said connecting rod to said arm, and means for uniformly rotating said crank pin in its orbit in timed relation with said knife reciprocating means, whereby the knives close once each oscillation and the arm has a speed on the cutting stroke different from that on the return stroke.

15. In a flying shear comprising an arm oscillatable about a pivot and having knives therein mounted for relative radial reciprocating movement toward and away from each other, knife reciprocating means, means for oscillating said arm through a fixed regular displacement, said oscillating means comprising a crank pin rotating in a fixed circular orbit and a connecting rod pivotally connected at its ends to said arm and said crank pin, respectively, the center of said orbit being at one side of said arm and spaced from the line through the extreme positions of the pivotal connection of said connecting rod to said arm, and means for uniformly rotating said crank pin in its orbit in timed relation with said knife reciprocating means, and in such direction as to move the arm at a speed on the cutting stroke greater than the speed on the return stroke, the knives closing once at each oscillation of said arm.

16. An edge-trimming shear comprising a housing, parallel sleeves rotatably mounted in said housing, a shaft journaled in each sleeve eccentrically of the axis of rotation of the sleeve, cooperating cutting discs mounted on said shafts, worm gears on said sleeves and a worm shaft meshing with said gears for rotating the sleeves to adjust said discs radially toward and away from each other.

WILLIAM B. HACKETT.